United States Patent

Devaux et al.

Patent Number: 5,861,971
Date of Patent: Jan. 19, 1999

[54] INLINE MODULATOR DEVICE FOR AN OPTICAL TRANSMISSION SYSTEM

[75] Inventors: Fabrice Devaux; Francis Pirio, both of Paris, France

[73] Assignee: France Telecom, France

[21] Appl. No.: 724,639

[22] Filed: Oct. 1, 1996

[30] Foreign Application Priority Data

Oct. 2, 1995 [FR] France ................................. 95 11560

[51] Int. Cl.⁶ .......................... H04B 10/14; H04B 10/16
[52] U.S. Cl. .......................... 359/176; 359/158; 359/179
[58] Field of Search .......................... 359/158, 174–177, 359/179

[56] References Cited

U.S. PATENT DOCUMENTS

| | | | |
|---|---|---|---|
| 5,401,957 | 3/1995 | Suzuki et al. | 359/187 |
| 5,594,583 | 1/1997 | Devaux | 359/184 |
| 5,625,636 | 4/1997 | Bryan et al. | 372/50 |

FOREIGN PATENT DOCUMENTS

| | | |
|---|---|---|
| 0 555 063 A2 | 2/1993 | European Pat. Off. . |
| A 0 630 123 | 6/1994 | European Pat. Off. . |
| 000564303 | 7/1994 | Japan . |
| 2177 878 | 7/1995 | United Kingdom . |
| WO 92/09159 | 5/1992 | WIPO . |

*Primary Examiner*—Leslie Pascal
*Attorney, Agent, or Firm*—Blakely Sokoloff Taylor & Zafman

[57] ABSTRACT

An inline modulator device for an optical transmission system, the device comprising: detector means suitable for detecting a portion of the signal transmitted on the line; modulator means; and a control circuit adjustable for synchronization, serving to extract the clock from the signal coming from the detector means and, on the basis of said clock, generating a modulation control signal which it applies to the modulator means, wherein the detector means and the modulator means are constituted respectively by the inlet section and the outlet section of an electro-absorbent modulator constituted by a two-section integrated component, such that said detector means and modulator means can be placed in the line in the form of a single insertion. The present invention also provides optical telecommunications systems using such an inline modulator device.

34 Claims, 6 Drawing Sheets

INLINE MODULATOR DEVICE FOR AN OPTICAL TRANSMISSION SYSTEM

The present invention relates to the field of inline modulator devices for optical transmission systems.

BACKGROUND OF THE INVENTION

Optical fiber transmission techniques are being used more and more for long-distance telecommunications since such techniques provide communications that are reliable at high data transmission rates.

However, whatever the type of modulation used (e.g. solitons or RZ modulation), pulses conveyed by fibers are subjected to deformation during propagation.

To solve this problem, long-distance optical fiber telecommunications system include inline repeater devices that resynchronize and reshape the transmitted pulses. Such repeater devices are uniformly distributed on such optical fiber lines, e.g. once every 50 km.

Various active control dispositions have also been proposed for optical transmission lines in order to increase range, data rate, or spacing between repeaters of optical fiber communications systems.

An effective method consists in inserting a modulator on the line with the control signal of the modulator varying periodically at the low frequency of the data rate (e.g. 20 GHz for 20 Gb/s). Associated with spectrum filtering, inline modulation puts pulses, and in particular soliton type pulses, back into shape, reducing jitter and noise.

Such inline modulation is applied in particular to long-range terrestrial or submarine systems.

For example, in early 1986, document JP-A-62189830 made proposals for an optical repeater device of the type shown in accompanying FIG. 1 and comprising an input optical amplifier 10, an isolator 11, and a bistable semiconductor laser 12 mounted in cascade on the line, together with a resistor 13 for detecting changes in the current injected into the input amplifier 10 under the influence of the light applied to the input of said amplifier, and a clock-extractor circuit 14 responsive to the voltage across the terminals of said resistor 13 and delivering an output signal which is applied to one of the electrodes of the laser 12.

Nevertheless, that device does not give complete satisfaction. In particular, it is limited in frequency and presents significant background noise.

It has therefore been abandoned in favor of dispositions of the type shown in FIG. 2 comprising a coupler 20 for extracting a portion of the input optical signal, a fast photodiode 22 for detecting said signal, and a clock extractor 24 for amplifying and processing the detected signal prior to applying it to a modulator 26 with a delay that is adjustable for synchronization.

The advantage of inline modulation has been demonstrated by Nakazawa et al. for soliton type transmission at 10 Gb/s over unlimited distance: [1] M. Nakazawa, E. Yamada, H. Kubota, K. Suzuki, "10 Gb/s soliton data transmission over one million kilometers", Electron. Lett., Vol. 27, p. 1270, 1991. Nakazawa's demonstration used a Mach-Zehnder interferometer type inline modulator on a substrate of $LiNbO_3$.

It has been shown that with that type of configuration, the spacing between amplifiers can be increased by a factor of 2 (e.g. from 50 km to 100 km): [2] G. Aubin, T. Montalant, J. Moulu, B. Nortier, F. Pirio, J. B. Thomine, "Record amplifier span of 105 km in a soliton data demonstration experiment at 10 Gb/s over one million kilometers", Electron. Lett., Vol. 3, p. 217, 1995. In theory, that should enable a transoceanic system to be reduced substantially in cost. Never-the-less, inline use of that type of modulator is not very realistic since optical transmission through an $LiNbO_3$ modulator depends strongly on the polarization state of the light.

Also, $LiNbO_3$ modulators require a large control voltage and suffer from slow drift of the operating point (thereby degrading transmission).

In an attempt to remedy the problem of sensitivity to the polarization state of the light, proposals have been made to use two modulators on an $LiNbO_3$ substrate in an orthogonal configuration: [3] M. Nakazawa, K. Suzuki, H. Kubota, E. Yamada, Y. Kimura, "20 Gb/s-3000 km straight line soliton transmission beyond Gordon-Hauss limit", Optoelectronics Conference (OEC'94), post-deadline proceedings, p. 6.

More recently, to eliminate the above-mentioned drawback of $LiNbO_3$ modulators, proposals have been made to use an electroabsorbent modulator to provide inline signal modulation: [4] G. Aubin, E. Jeannery, T. Montalant, J. Moulu, F. Pirio, J. B. Thomine, F. Devaux, "20 Gb/s soliton transmission over transoceanic distance with a 105 km amplifier span", Electron. Lett., Vol. 31, No. 13, p. 1079, 1995.

Nevertheless, the above-mentioned devices do not give full satisfaction.

In particular, all of those known devices require an environment that is complex.

OBJECTS AND SUMMARY OF THE INVENTION

An object of the present invention is to improve known inline modulator devices for optical transmission systems.

According to the invention, this object is achieved by an inline modulator device for an optical transmission system, the device comprising:

detector means suitable for detecting a portion of the signal transmitted on the line;

modulator means; and a control circuit adjustable for synchronization, serving to extract the clock from the signal coming from the detector means and, on the basis of said clock, generating a modulation control signal which it applies to the modulator means, wherein the detector means and the modulator means are constituted respectively by the inlet section and the outlet section of an electroabsorbent modulator constituted by a two-section integrated component, such that said detector means and modulator means can be placed in the line in the form of a single insertion.

BRIEF DESCRIPTION OF THE DRAWINGS

Other characteristics, objects, and advantages of the present invention appear on reading the following detailed description given with reference to the accompanying drawings, given as non-limiting examples, and in which.

MORE DETAILED DESCRIPTION

Figure 1:
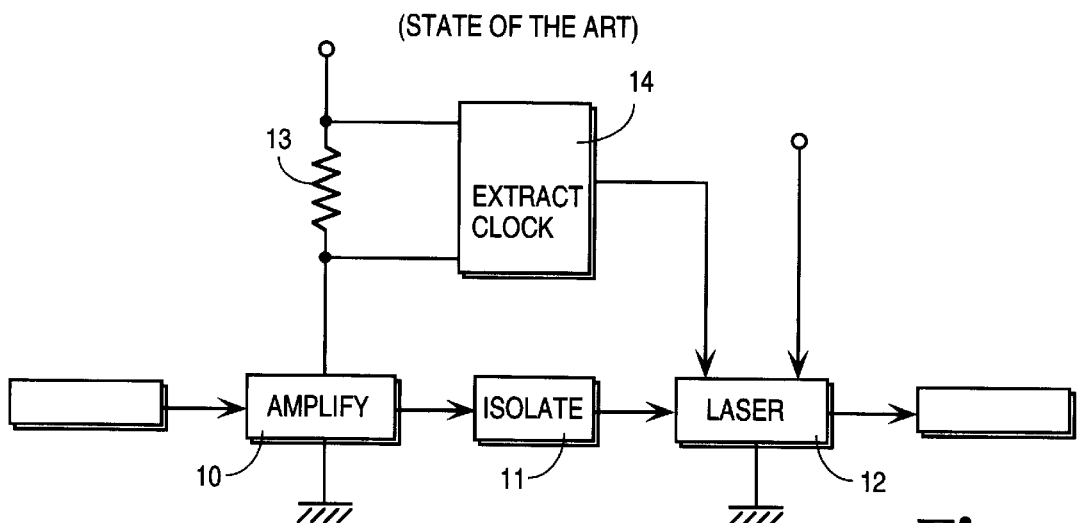
FIGS. 1 and 2 are described above and show two devices forming part of the state of the art.
Figure 2:
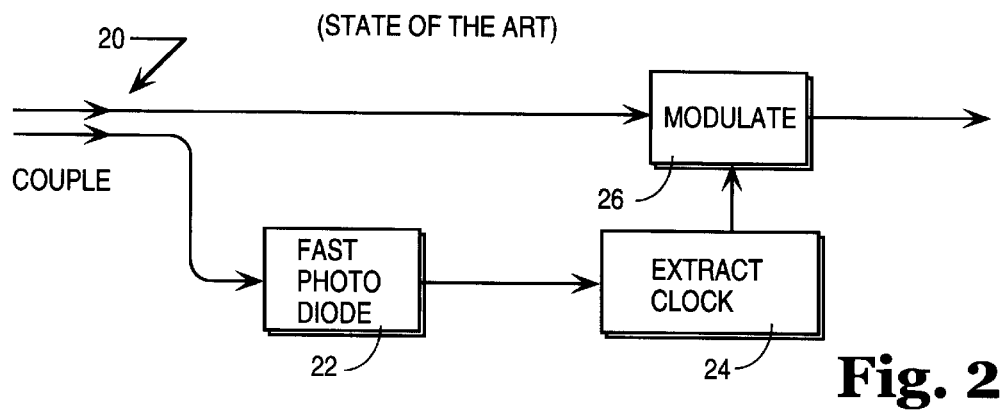
Figure 3:
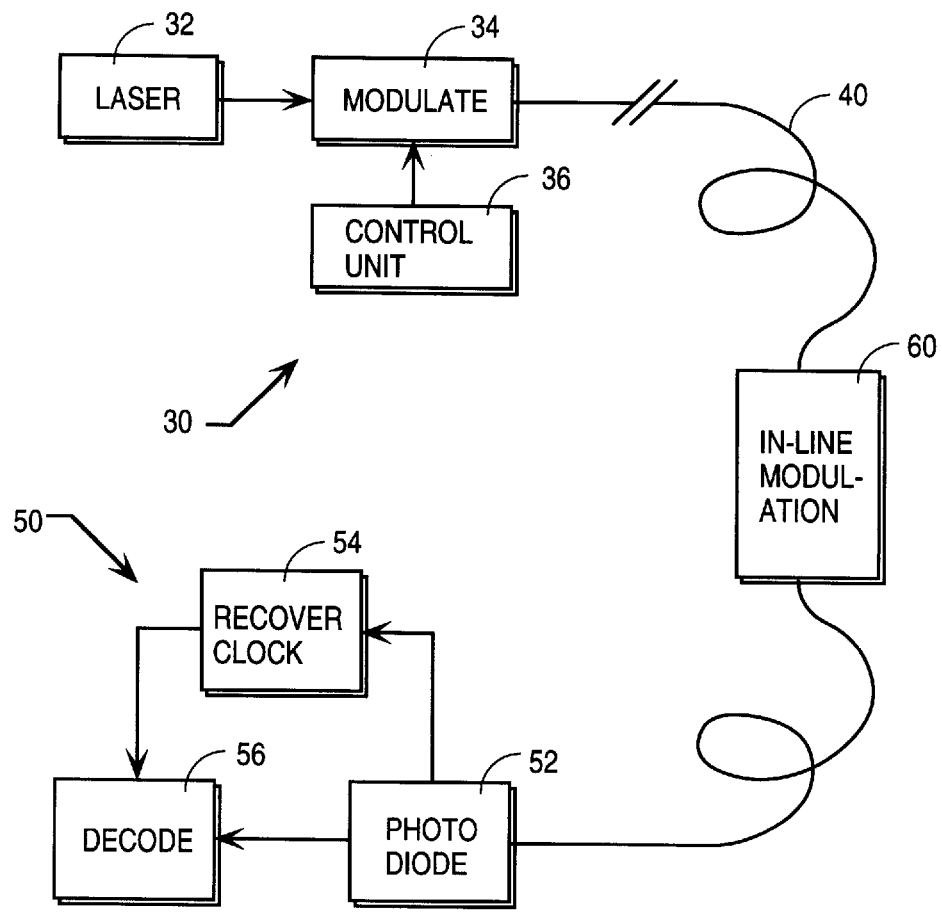
FIG. 3 is a block diagram of an optical transmission system of the present invention.
Figure 4:
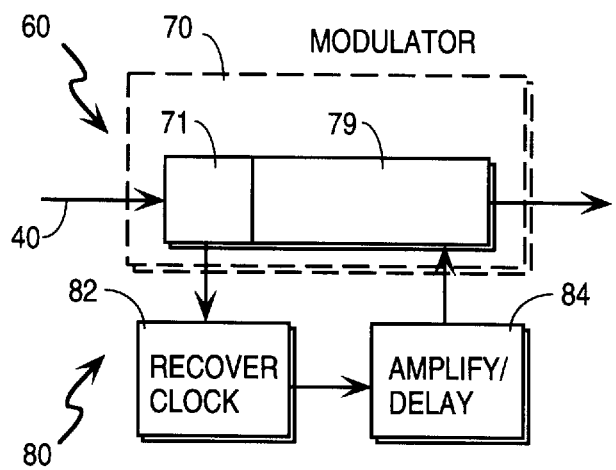
FIG. 4 is a diagrammatic view of an inline modulator device of the present invention.

The optical transmission system of the present invention shown in accompanying FIG. 3 comprises input means 30 for generating modulated optical pulse trains, an optical fiber circuit 40 for propagation of the above-mentioned pulses, means 50 for detecting and decoding said pulses at the outlet from the fiber circuit 40, and at least one inline modulator device 60 for reshaping optical pulse trains, and preferably a plurality of such devices 60 that are regularly disposed on the line 40.

The generator means 30 preferably comprise a laser source 32 and a modulator 34 controlled by a control unit 36.

The detector means 50 comprise, for example, a photodiode 52 which converts the optical signal it receives into an electrical pulse train, which signal is applied firstly to a clock recovery circuit 54 and secondly, together with the recovered clock signal, to a processor unit 56 for decoding the transmitted signal.

The modulator device 60 of the present invention essentially comprises an electroabsorbent modulator 70 and a control circuit 80.

Electroabsorbent modulators are constituted by waveguides having a core material that presents absorption that is controllable as a function of the voltage applied thereto.

More precisely, in the context of the present invention, the electroabsorbent modulator 70 is a two-section modulator 71, 79: comprising a first section 71 whose input receives the optical pulse trains conveyed by the line 40 and serves to detect a portion of the signal transmitted in this way; and a second section 79 which modulates said pulses.

The control circuit 80 comprises a module 82 which extracts the clock from the signal coming from the first section 71, and an amplification module 84 of adjustable delay for generating a modulation control signal applied to the section 79 so as to modulate the optical signal that has not been absorbed by the first section 71.

The basic structure of the modulator 70 is similar to that of a conventional prior art electroabsorbent modulator. The active material 73 is inserted in the core of a waveguide between a substrate 72 of a first type (e.g. N) and a confinement layer 74 of a second type (e.g. P). Dopants are added to the various layers of semiconductor material to constitute a P–I–N diode.

For a substrate 72 of type N (or P), electrical insulation takes place in the regions of type I and P (or N).

The invention makes it possible to combine the functions of the optical fiber coupler 20 and the fast photodiode 22 of the state of the art in the form of the first section 71 with the electroabsorbent modulator 79 on a common substrate 72.

The first section 71 of the modulator 70 is used as an adjustable tapping photodiode (e.g. tapping 50%). The tapping rate is adjusted by the bias voltage.

Since the two sections 71 and 79 are integrated in a common component, the high frequency signal applied to the modulation section 79 is induced in part in the first section 71 used for detection. This signal may combine with the detected current to cause the assembly to perform self-sustaining oscillation.

To reduce the risks of cross-coupling, various approaches are proposed both in the modulator-forming component 70 and in the control circuit 80.

Figure 5:
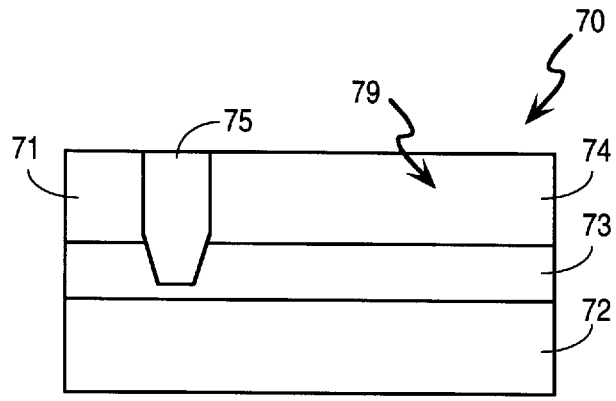
FIG. 5, 6, 7, and 8 are diagrams showing four variant embodiments of an electroabsorbent modulator of the present invention.

In a first variant shown diagrammatically in FIG. 5, isolation between the two sections 71 and 79 can be achieved by ion implantation followed by annealing in a short zone 75 of the waveguide, e.g. a zone that is 10 $\mu$m long, both in the confinement layer 74 and in a portion of the core-forming layers of active material 73. The material treated in this way has high resistivity.

Figure 6:
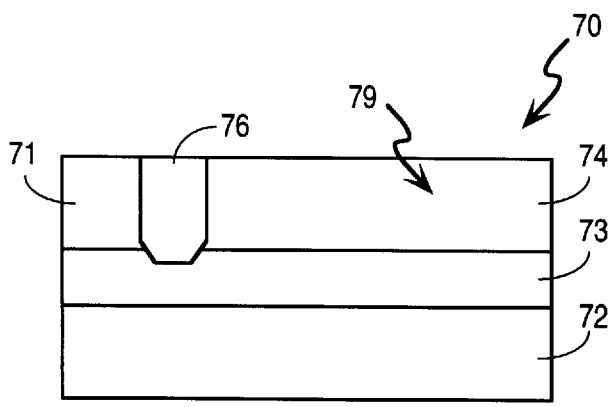

In a second variant shown diagrammatically in FIG. 6, isolation between the sections 71 and 79 can be obtained by etching a short zone of the waveguide and filling it with an electrically insulating material 76 (non-doped semiconductor, semi-isolator, dielectric, etc. . . . ).

Figure 7:
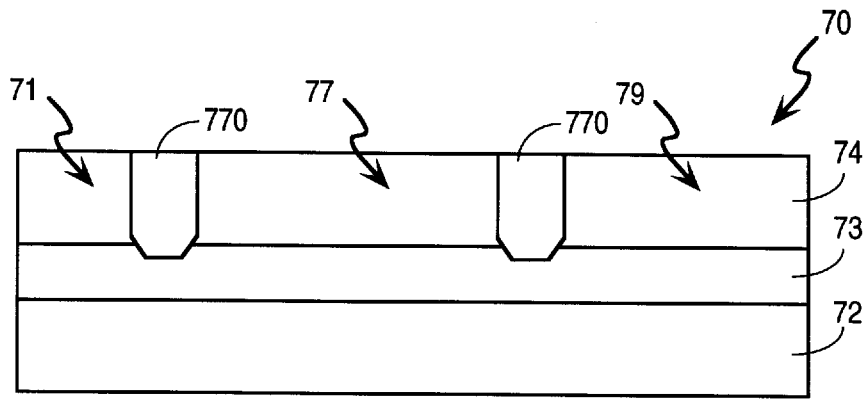
Figure 8:
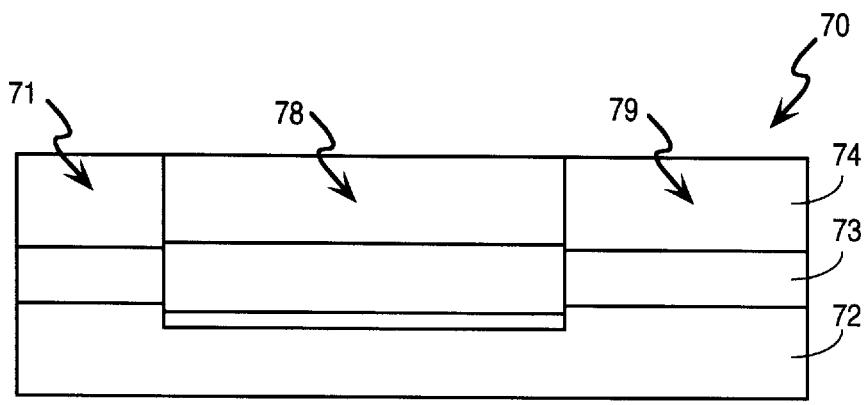

In other variants shown diagrammatically in FIGS. 7 and 8, isolation between the two sections 71 and 79 is obtained by separating the two sections physically. Cross-coupling is thus reduced by increasing the distance between the two sections 71 and 79 by inserting a length of optical waveguide.

More precisely, in the variant shown in FIG. 7, a central section 77 between the two sections 71 and 79 can be provided, being defined by two zones 770 of electrical insulation. Current can be injected into the central section 77 to provide a medium between the two sections 71 and 79 that is slightly absorbent or that presents gain.

In the variant shown in FIG. 8, a large portion of the waveguide between the two sections 71 and 79 is etched, and the materials constituting a low loss waveguide 78 are rebuilt by a second epitaxial operation in said etched zone.

The first section 71 which acts as a photodiode converts some of the optical signal it receives at its input into an electrical signal.

The function of the module 82 is to extract a control signal of frequency $\underline{f}$ from the signal conveying information with a clock of said frequency $\underline{f}$. The control signal is then amplified and delayed so as to be put into phase with the optical pulses transmitted from the first section 71 to the second section, at the time said pulses are passing through the modulator section 79.

This delay may be preset or adjustable.

The delay may also be servo-controlled in application of the teaching of document FR-A-2 706 710. To do this, the phase of the control signal from the module 84 is controlled to minimize the average photocurrent coming from the modulator 79 when it is in its absorbent state and it is receiving a light pulse.

The clock extractor circuit 82 may have various forms.

Figure 9:
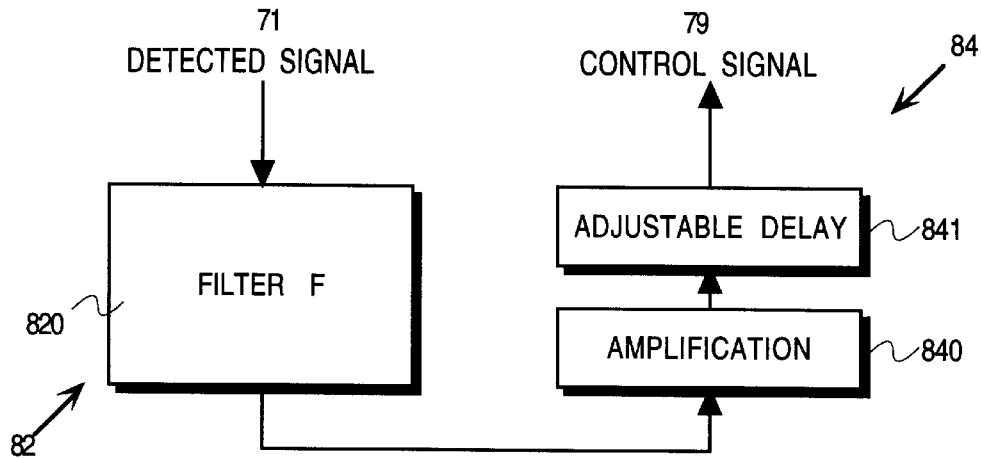
FIGS. 9, 10, and 11 are block diagrams of three variant control circuits of the present invention.

The simplest is to perform filtering at the fundamental frequency $\underline{f}$ in a filter 820 followed by amplification and adjustable delay in cells 840 and 841 provided for this purpose in the processor module 84, as shown diagrammatically in FIG. 9.

However, that method can be used only with an optoelectronic component having very low cross-coupling.

Figure 10:
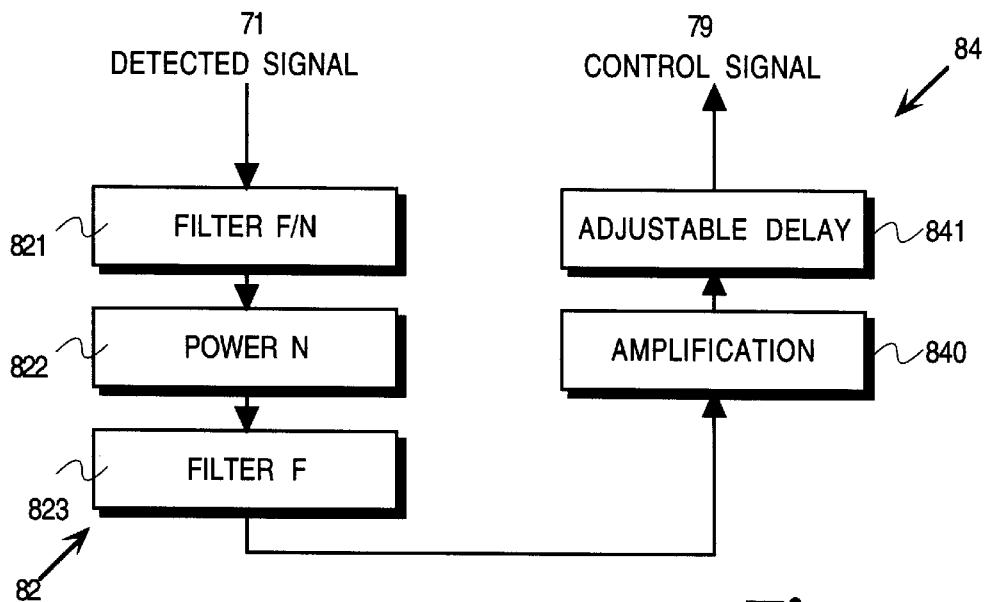

Thus, in a first variant shown diagrammatically in FIG. 10, the module 82 uses a filter 821 to extract the signal available in the vicinity of a submultiple f/n of the fundamental frequency (where $\underline{n}$ is an integer, e.g. equal to 2), then raising the frequency of the extracted signal to the power $\underline{n}$ in a cell 822 prior to filtering it in a filter 823 centered on the fundamental frequency $\underline{f}$. The resulting signal is then subjected to amplification 841 and to adjustable delay 842 in the module 84.

Figure 11:
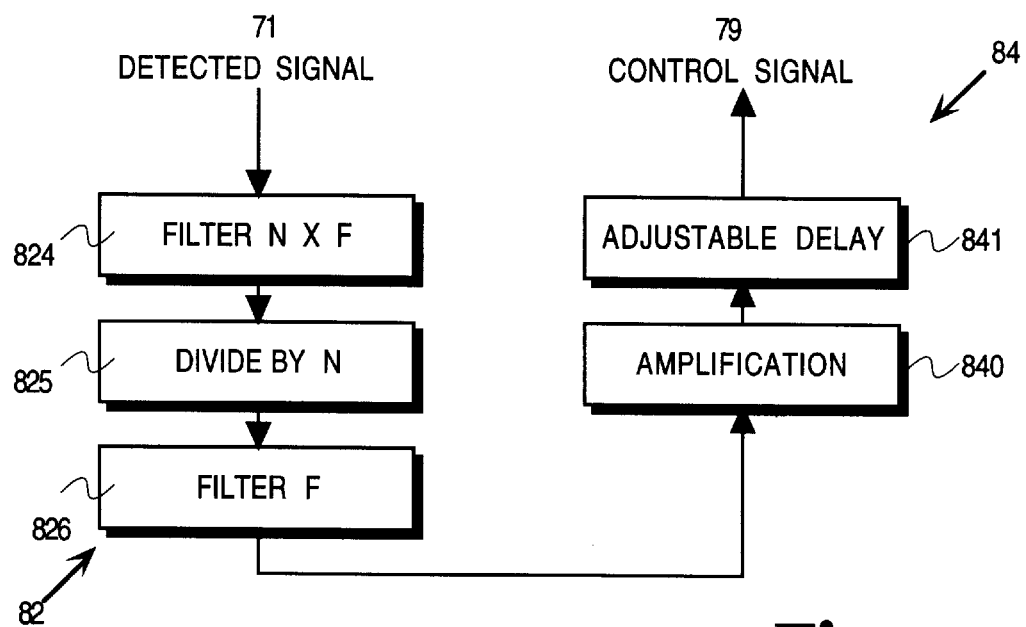

In a second variant, shown diagrammatically in FIG. 11, the module 82 extracts, instead, the signal available at a harmonic, e.g. of order 2, by means of an n×f filter 824

($n$ is an integer) and then the frequency of the extracted signal is divided by the factor $n$ in a cell 825 prior to being filtered in a filter 826 centered on the fundamental frequency $f$. The signal obtained in this way is likewise subjected to amplification 841 and to adjustable delay 842 in the module 84 so as to provide the control signal applied to the second section 79 of the modulator 70.

Naturally, the present invention is not limited to the above-described embodiments, but extends to any variant within the spirit of the invention.

The use of an inline electroabsorbent modulator 70 as proposed in the present invention presents several advantages over prior art devices, and in particular: very large passband; low control voltage; low sensitivity to light polarization; and no slow drift of optical transmission.

In addition, the present invention makes it possible to obtain modulation that is synchronized at the data rate, using only one insertion on the line.

The present invention can be applied to all long-distance and very high data rate optical fiber communications systems.

Compared with known prior devices, it makes it possible to reduce the number of components that are required while increasing the quality performance of transmission provided by a high data rate optical fiber link, thereby making it possible to increase spacing between amplifiers (typically greater than 100 km) without degrading signal transmission, thus reducing the cost of long-range links, in particular transoceanic links.

We claim:

1. An inline modulator device for an optical transmission system, the device comprising:
    detector means suitable for detecting a portion of the signal transmitted on the line;
    modulator means; and
    a control circuit adjustable for synchronization, serving to extract the clock from the signal coming from the detector means and, on the basis of said clock, generating a modulation control signal which it applies to the modulator means,
    wherein the detector means and the modulator means are constituted respectively by the inlet section and the outlet section of an electroabsorbent modulator constituted by a two-section integrated component, such that said detector means and modulator means can be placed in the line in the form of a single insertion.

2. A device according to claim 1, wherein the electroabsorbent modulator includes means for limiting cross-coupling.

3. A device according to claim 1, wherein the electroabsorbent modulator includes an ion implantation zone between the two sections.

4. A device according to claim 1, wherein the electroabsorbent modulator includes a zone of insulating material between the two sections.

5. A device according to claim 4, wherein the material is selected from the group comprising: a non-doped semiconductor, a semi-insulator, and a dielectric.

6. A device according to claim 1, wherein the electroabsorbent modulator includes a central section between the two sections and defined by two zones of electrical insulation.

7. A device according to claim 6, including means suitable for injecting current into the central section.

8. A device according to claim 1, wherein the electroabsorbent modulator includes, between two sections, a zone of material constituting a low loss waveguide made by performing a second epitaxial operation in the modulator, after it has been etched.

9. A device according to claim 1, wherein the control circuit includes means suitable for extracting a portion of the signal at the fundamental frequency ($f$).

10. A device according to claim 1, wherein the control circuit includes means for limiting cross-coupling.

11. A device according to claim 10, wherein the control circuit includes means adapted to extracting a portion of the signal at a frequency ($f/n$) that is an n-th submultiple of the fundamental frequency ($f$), and means suitable for raising the frequency of the extracted signal to the power $n$.

12. A device according to claim 10, wherein the control circuit includes means adapted to extract a portion of the signal at a frequency ($f \times n$) that is an n-th harmonic of the fundamental frequency ($f$), and means suitable for dividing the frequency of the extracted signal to obtain the fundamental ($f$).

13. A device according to claim 11, wherein the control circuit further includes a filter at the fundamental frequency ($f$) at the outlet from the clock extractor means.

14. A device according to claim 1, wherein the control circuit includes an amplifier cell and an adjustable delay cell.

15. A long-distance optical fiber telecommunications system comprising:
    generator means for generating modulated optical pulse trains;
    recovery and decoder means for detecting and decoding said pulses;
    an optical fiber circuit for propagating pulses between the generator means and the recovery and decoding means; and
    at least one inline modulator device according to claim 1, for inline reshaping of the pulse trains.

16. An inline modulator device for an optical transmission system, the device comprising:
    detector means suitable for detecting a portion of the signal transmitted on the line;
    modulator means; and
    a control circuit adjustable for synchronization, serving to extract the clock from the signal coming from the detector means and, on the basis of said clock, generating a modulation control signal which it applies to the modulator means,
    wherein the detector means and the modulator means are constituted respectively by the inlet section and the outlet section of an electroabsorbent modulator constituted by a two-section integrated component, such that said detector means and modulator means can be placed in the line in the form of a single insertion, and wherein the electroabsorbent modulator includes a zone of insulating material between the two sections, said insulating material being selected from the group comprising: a non-doped semiconductor, a semi-insulator and a dielectric.

17. A device according to claim 16, wherein the control circuit includes means suitable for extracting a portion of the signal at the fundamental frequency ($f$).

18. A device according to claim 16, wherein the control circuit includes means for limiting cross-coupling.

19. A device according to claim 18, wherein the control circuit includes means adapted to extracting a portion of the signal at a frequency ($f/n$) that is an n-th submultiple of the fundamental frequency ($f$), and means suitable for raising the frequency of the extracted signal to the power $n$.

20. A device according to claim 18, wherein the control circuit includes means adapted to extract a portion of the signal at a frequency (f×n) that is an n-th harmonic of the fundamental frequency (f), and means suitable for dividing the frequency of the extracted signal to obtain the fundamental (f).

21. A device according to claim 19, wherein the control circuit further includes a filter at the fundamental frequency (f) at the outlet from the clock extractor means.

22. A device according to claim 16, wherein the control circuit includes an amplifier cell and an adjustable delay cell.

23. An inline modulator device for an optical transmission system, the device comprising:

detector means suitable for detecting a portion of the signal transmitted on the line;

modulator means; and a control circuit adjustable for synchronization, serving to extract the clock from the signal coming from the detector means and, on the basis of said clock, generating a modulation control signal which it applies to the modulator means, wherein the detector means and the modulator means are constituted respectively by the inlet section and the outlet section of an electroabsorbent modulator constituted by a two-section integrated component, such that said detector means and modulator means can be placed in the line in the form of a single insertion, and wherein the electroabsorbent modulator includes a central section between the two sections and defined by two zones of electrical insulation.

24. A device according to claim 23, including means suitable for injecting current into the central section.

25. A device according to claim 23, wherein the control circuit includes means suitable for extracting a portion of the signal at the fundamental frequency (f).

26. A device according to claim 23, wherein the control circuit includes means suitable for limiting cross-coupling.

27. A device according to claim 26, wherein the control circuit includes means adapted to extracting a portion of the signal at a frequency (f/n) that is an n-th submultiple of the fundamental frequency (f), and means suitable for raising the frequency of the extracted signal to the power $\underline{n}$.

28. A device according to claim 26, wherein the control circuit includes means adapted to extract a portion of the signal at a frequency (f×n) that is a n-th harmonic of the fundamental frequency (f), and means suitable for dividing the frequency of the extracted signal to obtain the fundamental (f).

29. A device according to claim 27, wherein the control circuit further includes a filter at the fundamental frequency (f) at the outlet from the clock extractor means.

30. A device according to claim 23, wherein the control circuit includes an amplifier cell and an adjustable delay cell.

31. An inline modulator device for an optical transmission system, the device comprising:

detector means suitable for detecting a portion of the signal transmitted on the line;

modulator means; and a control circuit adjustable for synchronization, serving to extract the clock from the signal coming from the detector means and, on the basis of said clock, generating a modulation control signal which it applies to the modulator means, wherein the detector means and the modulator means are constituted respectively by the inlet section and the outlet section of an electroabsorbent modulator constituted by a two-section integrated component, such that said detector means and modulator means can be placed in the line in the form of a single insertion, and wherein the control circuit includes means for limiting cross-coupling, said control circuit includes means adapted to extracting a portion of the signal at a frequency (f/n) that is an n-th submultiple of the fundamental frequency (f), and means suitable for raising the frequency of the extracted signal to the power $\underline{n}$.

32. A device according to claim 31, wherein the control circuit further includes a filter at the fundamental frequency (f) at the outlet from the clock extractor means.

33. An inline modulator device for an optical transmission system, the device comprising:

detector means suitable for detecting a portion of the signal transmitted on the line;

modulator means; and a control circuit adjustable for synchronization, serving to extract the clock from the signal coming from the detector means and, on the basis of said clock, generating a modulation control signal which it applies to the modulator means, wherein the detector means and the modulator means are constituted respectively by the inlet section and the outlet section of an electroabsorbent modulator constituted by a two-section integrated component, such that said detector means and modulator means can be placed in the line in the form of a single insertion, and wherein the control circuit includes means for limiting cross-coupling, said control circuit includes means adapted to extract a portion of the signal at a frequency (f×n) that is a n-th harmonic of the fundamental frequency (f), and means suitable for dividing the frequency of the extracted signal to obtain the fundamental (f).

34. A device according to claim 33, wherein the control circuit further includes a filter at the fundamental frequency (f) at the outlet from the clock extractor means.

* * * * *

UNITED STATES PATENT AND TRADEMARK OFFICE
CERTIFICATE OF CORRECTION

PATENT NO. : 5,861,971
DATED      : January 19, 1999
INVENTOR(S) : Devaux et al.

It is certified that error appears in the above-identified patent and that said Letters Patent is hereby corrected as shown below:

On the title page item

[56], delete "2177 878      7/1995     United Kingdom" and insert --
2177 868      7/1995     United Kingdom -- .

Signed and Sealed this

Seventh Day of November, 2000

Attest:

Q. TODD DICKINSON

*Attesting Officer*      *Director of Patents and Trademarks*